United States Patent
Chu

(10) Patent No.: US 12,386,373 B2
(45) Date of Patent: Aug. 12, 2025

(54) POWER SUPPLY CIRCUIT AND CONTROL METHOD THEREOF

(71) Applicant: Realtek Semiconductor Corporation, Hsinchu (TW)

(72) Inventor: Li Cheng Chu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 208 days.

(21) Appl. No.: 18/472,265

(22) Filed: Sep. 22, 2023

(65) Prior Publication Data

US 2024/0223083 A1 Jul. 4, 2024

(30) Foreign Application Priority Data

Dec. 30, 2022 (TW) .................................. 111150972

(51) Int. Cl.
| | |
|---|---|
| *H02M 1/32* | (2007.01) |
| *G05F 1/573* | (2006.01) |
| *H02M 1/088* | (2006.01) |
| *H02M 3/158* | (2006.01) |
| *H02M 3/07* | (2006.01) |

(52) U.S. Cl.
CPC ............ *G05F 1/573* (2013.01); *H02M 1/088* (2013.01); *H02M 1/32* (2013.01); *H02M 3/158* (2013.01); *H02M 3/07* (2013.01); *H02M 3/075* (2021.05)

(58) Field of Classification Search
CPC ........ H02M 1/32; H02M 1/088; H02M 3/158; G05F 1/46; G05F 1/56; G05F 1/573; G05F 1/575
See application file for complete search history.

(56) References Cited

U.S. PATENT DOCUMENTS

| | | | | |
|---|---|---|---|---|
| 6,677,738 | B1* | 1/2004 | Hesse | H02H 7/1213 323/284 |
| 10,586,791 | B2* | 3/2020 | Ma | H10D 89/815 |
| 12,081,016 | B2* | 9/2024 | Li | H02H 7/12 |
| 2008/0290853 | A1* | 11/2008 | Ito | H03K 17/08122 323/283 |
| 2010/0264887 | A1* | 10/2010 | Ohshima | H03K 3/2826 323/234 |
| 2011/0156688 | A1* | 6/2011 | Lin | H02M 3/00 323/284 |
| 2014/0266098 | A1* | 9/2014 | Dao | G05F 1/573 323/273 |
| 2017/0093145 | A1 | 3/2017 | Nate | |

FOREIGN PATENT DOCUMENTS

TW 202017288 A 5/2020

\* cited by examiner

*Primary Examiner* — Gary L Laxton
(74) *Attorney, Agent, or Firm* — CKC & Partners Co., LLC

(57) ABSTRACT

A power supply circuit includes a voltage generator circuit, an overcurrent protection circuit, and a power switch circuit. The voltage generator circuit is configured to generate a first voltage. The overcurrent protection circuit is configured to generate a comparison voltage according to a reference voltage and a sensing voltage. A voltage clamping circuit in the overcurrent protection circuit is configured to generate a second voltage according to the first voltage and the comparison voltage. The power switch circuit is configured to generate an output current according to the second voltage and an input voltage. The sensing voltage is generated at a node in the power switch circuit and is associated with the output current.

20 Claims, 7 Drawing Sheets

POWER SUPPLY CIRCUIT AND CONTROL METHOD THEREOF

RELATED APPLICATIONS

This application claims priority to Taiwanese Application Serial Number 111150972, filed Dec. 30, 2022, which is herein incorporated by reference.

BACKGROUND

Technical Field

The present disclosure relates to power supply circuit technology. More particularly, the present disclosure relates to a power supply circuit and a control method thereof with an overcurrent protection mechanism.

Description of Related Art

With the progress of semiconductors, nowadays various circuits have been developed. In practical applications, one or more power switches are disposed in many circuits. By controlling the one or more power switches, the output current can be provided to the back-end load to allow the load to operate normally. However, when the load is too heavy, an excessively large output current is caused to flow through the one or more power switches, and even damage the circuit.

SUMMARY

Some aspects of the present disclosure provide a power supply circuit. The power supply circuit includes a voltage generator circuit, an overcurrent protection circuit, and a power switch circuit. The voltage generator circuit is configured to generate a first voltage. The overcurrent protection circuit is configured to generate a comparison voltage according to a reference voltage and a sensing voltage. A voltage clamping circuit in the overcurrent protection circuit is configured to generate a second voltage according to the first voltage and the comparison voltage. The power switch circuit is configured to generate an output current according to the second voltage and an input voltage. The sensing voltage is generated at a node in the power switch circuit and is associated with the output current.

Some aspects of the present disclosure provide a control method of a power supply circuit. The control method includes the following operations: generating, by a voltage generator circuit, a first voltage; generating, by an overcurrent protection circuit, a comparison voltage according to a reference voltage and a sensing voltage; generating, by a voltage clamping circuit in the overcurrent protection circuit, a second voltage according to the first voltage and the comparison voltage; and generating, by a power switch circuit, an output current according to the second voltage and an input voltage, wherein the sensing voltage is generated at a node in the power switch circuit and is associated with the output current.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
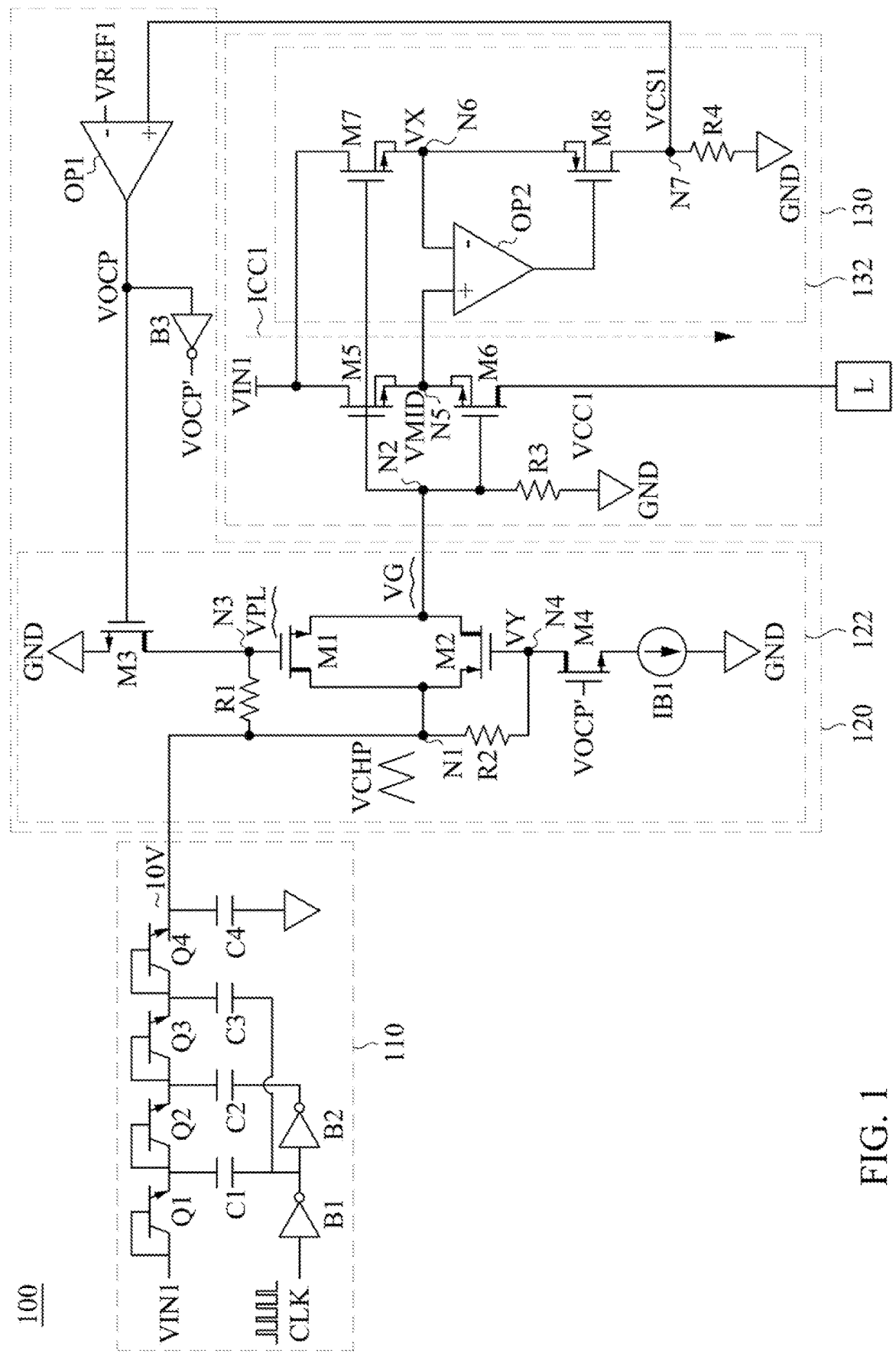
FIG. 1 depicts a schematic diagram of a power supply circuit according to some embodiments of the present disclosure.

Reference is made to FIG. 1. FIG. 1 depicts a schematic diagram of a power supply circuit 100 according to some embodiments of the present disclosure.

As illustrated in FIG. 1, the power supply circuit 100 includes a voltage generator circuit 110, an overcurrent protection circuit 120, and a power switch circuit 130. The voltage generator circuit 110 is coupled to the overcurrent protection circuit 120. The overcurrent protection circuit 120 is coupled to the power switch circuit 130.

The voltage generator circuit 110 is used to generate a first voltage VCHP at a node N1. The voltage generator circuit 110 in FIG. 1 is a charge pump (used to indirectly control N-type power switches M5-M6 in the power switch circuit 130 through the overcurrent protection circuit 120), but the present disclosure is not limited thereto. N-type power switches have a faster electron drift velocity and thus have the advantage of smaller area.

Figure 2:
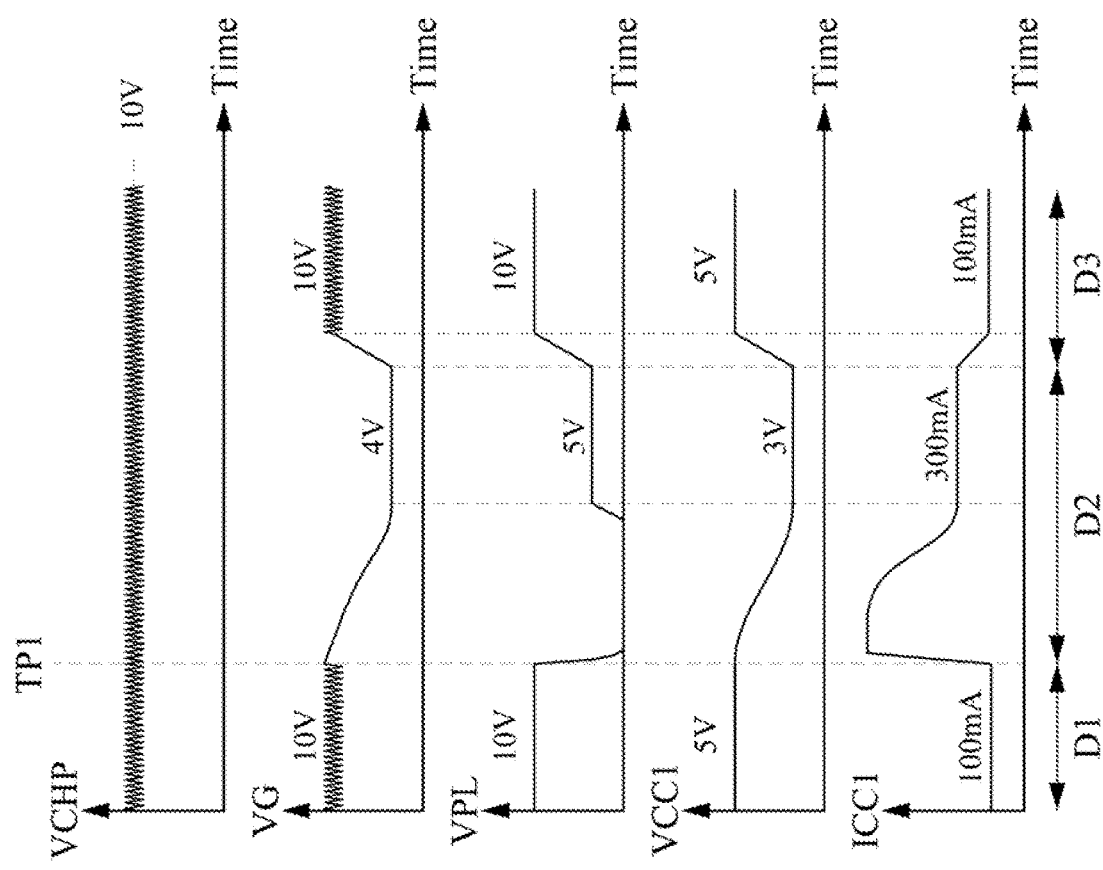
FIG. 2 depicts a waveform diagram of the power supply circuit in FIG. 1 according to some embodiments of the present disclosure.

As illustrated in FIG. 1, the voltage generator circuit 110 includes transistors Q1-Q4, coupling capacitors C1-C4, and inverters B1-B2, in which the transistors Q1-Q4 are bipolar transistors. The voltage generator circuit 110 can generate the relatively higher first voltage VCHP (e.g., 10 volts) at the node N1 according to an input voltage VIN1 (e.g., 5 volts) and a clock signal CLK. Since the clock signal CLK is a high-frequency signal, there are ripples in the first voltage VCHP, as shown in FIG. 2.

Although the above voltage generator circuit 110 is implemented by taking a specific type of charge pump as an example, the present disclosure is not limited thereto. In some other embodiments, the voltage generator circuit may be other types of charge pumps or may not be a charge pump.

The overcurrent protection circuit 120 is used to generate a comparison voltage VOCP according to a reference voltage VREF1 and a sensing voltage VCS1 from the power switch circuit 130.

As illustrated in FIG. 1, the overcurrent protection circuit 120 includes a comparator OP1, an inverter B3, and a voltage clamping circuit 122. A negative input terminal of the comparator OP1 receives the reference voltage VREF1. A positive input terminal of the comparator OP1 receives the sensing voltage VCS1 from the power switch circuit 130. The comparator OP1 compares the reference voltage VREF1 and the sensing voltage VCS1, so as to generate the comparison voltage VOCP at its output terminal. The inverter B3 receives the comparison voltage VOCP and inverts it to generate an inverted comparison voltage VOCP'.

The voltage clamping circuit 122 generates a second voltage VG at a node N2 according to the comparison voltage VOCP from the comparator OP1 and the first voltage VCHP from the voltage generator circuit 110. As illustrated in FIG. 1, the voltage clamping circuit 122 includes transistors M1-M4 and resistors R1-R2. In this example, the transistors M1, M3 and M4 are N-type transistors, and the transistor M2 is a P-type transistor. In addition, in this example, transistors M1-M4 are all high voltage transistors. The "high voltage transistor" disclosed herein refers to a transistor with a higher withstand voltage (e.g., a withstand voltage up to 12 volts). The transistor M1 is coupled between the node N1 and the node N2, and the transistor M2 is also coupled between the node N1 and the node N2. The transistor M3 is coupled between a control terminal (node N3) of the transistor M1 and a ground terminal GND. The transistor M4 is coupled between a control terminal (node N4) of the transistor M2 and the ground terminal GND. The resistor R1 is coupled between the node N1 and the control terminal of the transistor M1. The resistor R2 is coupled between the node N1 and the control terminal of the transistor M2. The output terminal of the comparator OP1 is coupled to a control terminal of the transistor M3 and the comparison voltage VOCP can turn on or turn off the transistor M3. An output terminal of the inverter B3 is coupled to a control terminal of the transistor M4 and the inverted comparison voltage VOCP' can be transmitted to the control terminal of the transistor M4 to turn on or turn off the transistor M4. Through the operation of the voltage clamping circuit 122, the second voltage VG is generated at the node N2.

The power switch circuit 130 is used to generate an output current ICC1 according to the second voltage VG and the input voltage VIN1, and provide the output current ICC1 to a load L.

As illustrated in FIG. 1, the power switch circuit 130 includes power switches M5-M6, a resistor R3, and a sensing circuit 132. The sensing circuit 132 includes transistors M7-M8, an operational amplifier OP2, and a resistor R4. In this example, the power switches M5-M6 and the transistor M7 are N-type transistors, and the transistor M8 is a P-type transistor. Additionally, in this example, the power switch M6 is a high voltage transistor.

The power switch M5 and the power switch M6 are coupled between the input voltage VIN1 and the load L. In greater detail, a first terminal of the power switch M5 receives the input voltage VIN1. A second terminal of the power switch M5 and a first terminal of the power switch M6 are coupled at a node N5. A second terminal of the power switch M6 is coupled to the load L and is used to provide the output current ICC1. A control terminal of the power switch M5 and a control terminal of the power switch M6 are both coupled to the node N2. The second voltage VG located at the node N2 can turn on or turn off the power transistor M5 and the power transistor M6. The resistor R3 is coupled between the node N2 and the ground terminal GND. The resistor R3 can prevent the voltage of the node N2 from being floating.

In this example, the power switch M5 and the power switch M6 are connected back-to-back between the input voltage VIN1 and the load L. That is to say, a source terminal of the power switch M5 is directly coupled to a source terminal of the power switch M6, so that a body diode of the power switch M5 and a body diode of the power switch M6 are disposed in opposite directions. Accordingly, the output current ICC1 can be prevented from flowing back from the load L to an input terminal, so this structure can be applied to some standards (e.g., USB Type-C). However, the present disclosure is not limited to this structure. In some other embodiments, a drain terminal of the power switch M5 can be directly coupled to a drain terminal of the power switch M6, which can also achieve the effect of preventing the current from flowing back.

In addition to that, the present disclosure is not limited to the power switch circuit including two power switches. The power switch circuits in some other embodiments may include only one or more than two power switches. In addition, the present disclosure is not limited to the power switch circuit being an N-type transistor. The power switch circuits in some other embodiments can be implemented by P-type transistors.

A first terminal of the transistor M7 is coupled to the first terminal of the power transistor M5. A second terminal of the transistor M7 and a first terminal of the transistor M8 are coupled at a node N6. A control terminal of the transistor M7 is coupled to the node N2. The second voltage VG located at the node N2 can turn on or turn off the power transistor M7. A second terminal of the transistor M8 is coupled to a node N7. A control terminal of the transistor M8 is coupled to an output terminal of the operational amplifier OP2. A positive input terminal of the operational amplifier OP2 is coupled to the node N5 to receive a voltage VMID. A negative input terminal of the operational amplifier OP2 is coupled to the node N6 to receive a voltage VX. The operational amplifier OP2 can amplify the voltage VMID and the voltage VX to output an amplified voltage so as to turn on or turn off the transistor M8. The resistor R4 is coupled between the node N7 and the ground terminal GND.

The sensing circuit 132 is used to sense the output current ICC1 so as to generate a sensing voltage VCS1 at the node N7 associated with the output current ICC1. In greater detail, if the voltage VMID is equal to the voltage VX, a current flowing through the power switch M5 and a current flowing through the transistor M7 are proportional to areas (or called aspect ratio, W/L) of the two. For example, under the circumstance that a ratio of the area of the power switch M5 to the area of the transistor M7 is 1000:1, the current flowing through the transistor M7 and the transistor M8 is 1 milliampere (mA) when the output current ICC1 flowing through the power switch M5 is 1 ampere (A). The current flowing through the transistor M8 and the resistor R4 can determine a voltage value of the sensing voltage VCS1. In this example, when the output current ICC1 flowing through the power switch M5 is larger, the current flowing through the transistor M7 and the transistor M8 is larger, so that the sensing voltage VCS1 is also higher.

As for how to control the voltage VMID to be equal to the voltage VX, the amplified voltage output by the operational amplifier OP2 is higher when the voltage VX is lower. When the amplified voltage output by the operational amplifier OP2 is higher, the conduction degree of the transistor M8 is smaller, so that the voltage VX increases. Through the negative feedback control, the voltage VMID and the voltage VX can be kept equal.

A detailed description of a normal mode and an overcurrent mode of the power supply circuit 100 is further provided as follows.

Figure 3:
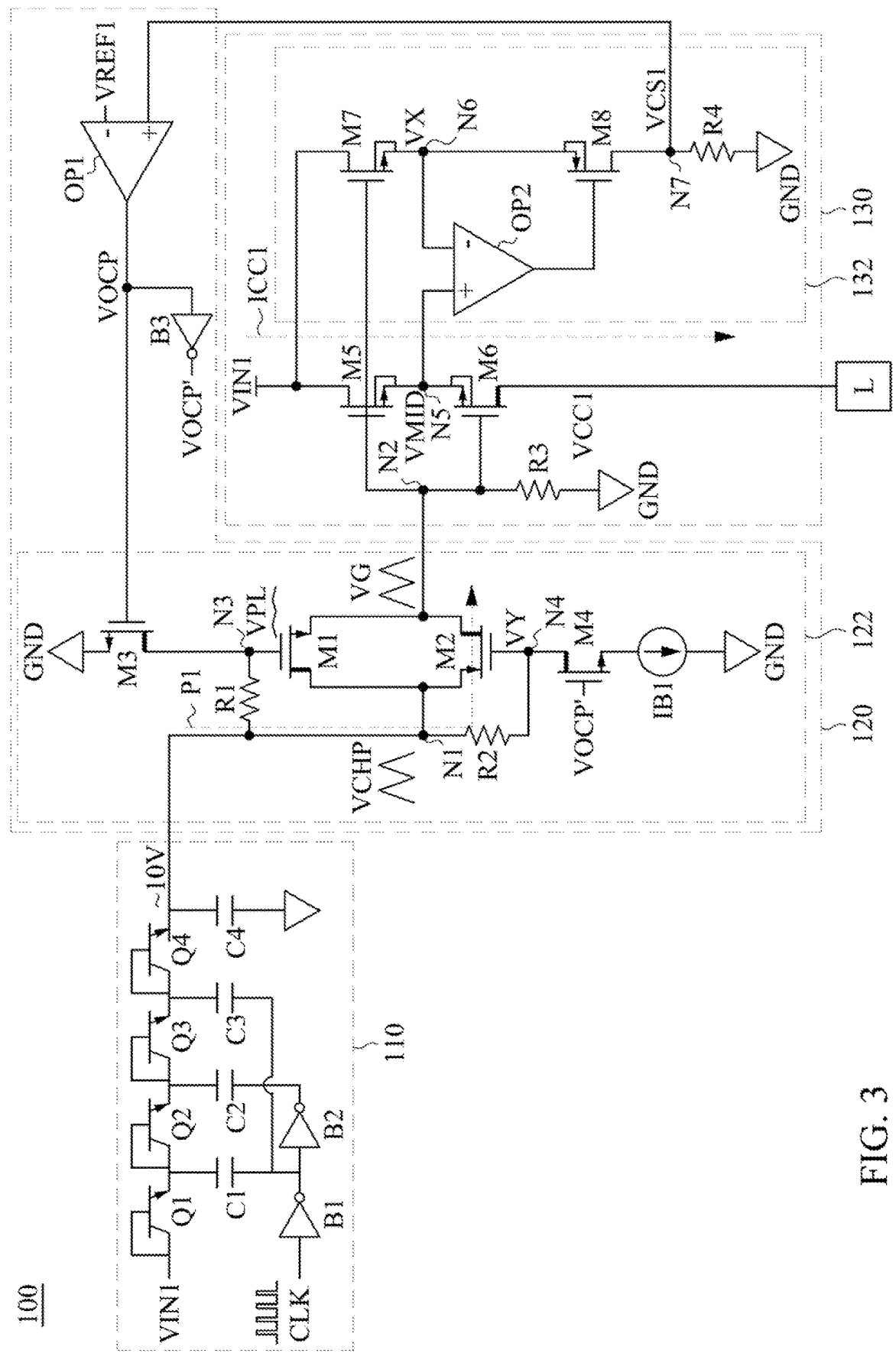
FIG. 3 depicts a schematic diagram of the power supply circuit in FIG. 1 in a normal mode according to some embodiments of the present disclosure.

FIG. 2 depicts a waveform diagram of the power supply circuit 100 in FIG. 1 according to some embodiments of the present disclosure. FIG. 3 depicts a schematic diagram of the power supply circuit 100 in FIG. 1 in the normal mode according to some embodiments of the present disclosure.

References are made to FIG. 2 and FIG. 3. Under the normal mode (time interval D1), the output current ICC1 flowing through the power switch M5 is not too large, which means that the current flowing through the transistor M7 and the transistor M8 is also not too large. Accordingly, the sensing voltage VCS1 is lower than the reference voltage VREF1. Since the sensing voltage VCS1 is lower than the reference voltage VREF1, the comparison voltage VOCP has a low logic value and the inverted comparison voltage VOCP' has a high logic value. The comparison voltage VOCP having the low logic value turns off the transistor M3 and the inverted comparison voltage VOCP' having the high logic value turns on the transistor M4. A voltage VY located at the node N4 is pulled down by a ground voltage of the ground terminal GND through the turned-on transistor M4 (forming a current IB1). The current IB1 and the resistor R2 can determine a voltage value of the voltage VY (e.g., 7 volts). At this time, a difference between the voltage VY (e.g., 7 volts) and the first voltage VCHP (e.g., 10 volts) can turn on the transistor M2, and the first voltage VCHP can charge the node N2 through the turned-on transistor M2 (corresponding to a path P1) to increase the second voltage VG to be equal to the first voltage VCHP (e.g., 10 volts).

Figure 4:
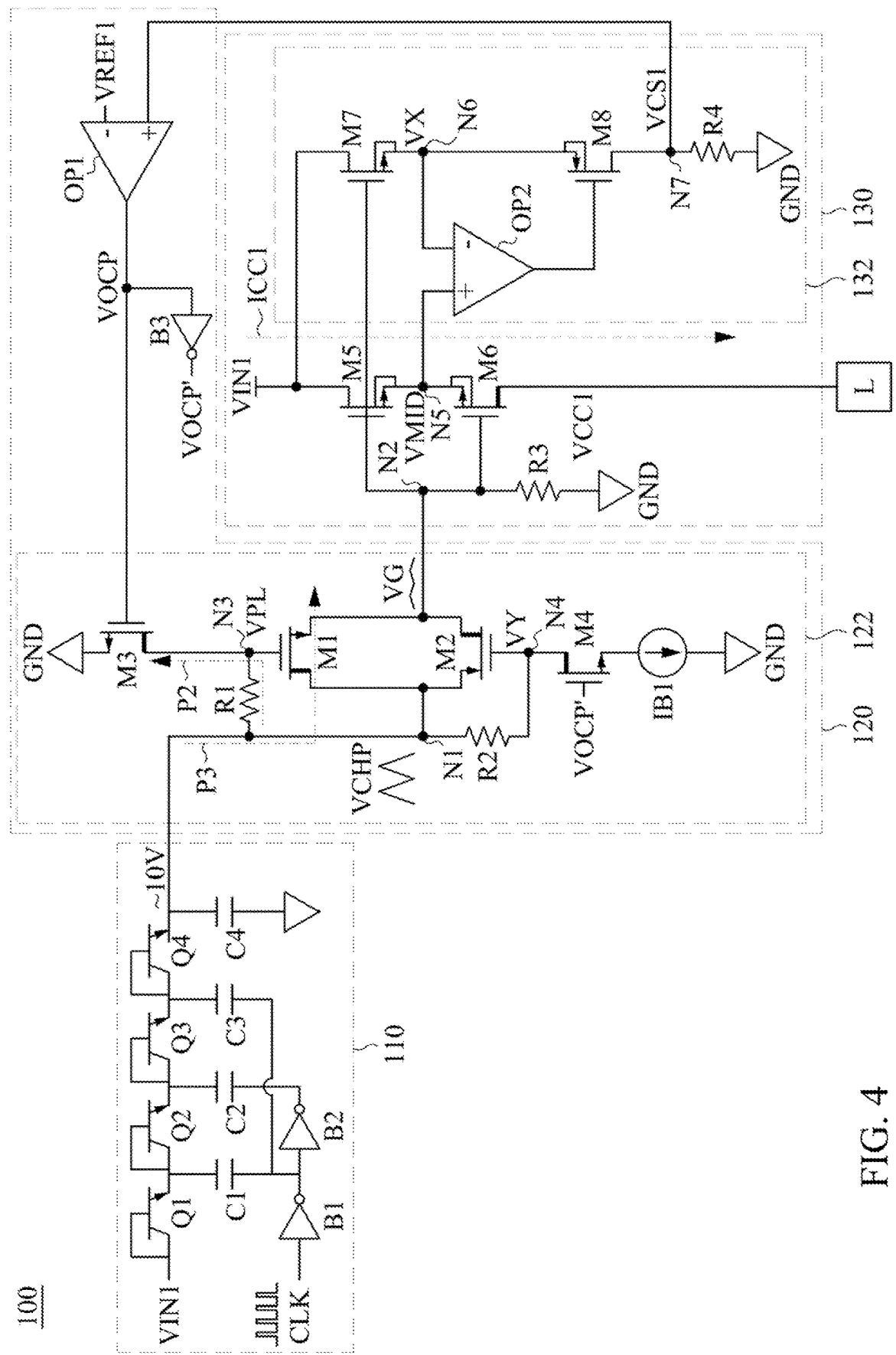
FIG. 4 depicts a schematic diagram of the power supply circuit in FIG. 1 in an overcurrent mode according to some embodiments of the present disclosure.

Reference is made to FIG. 2 and FIG. 4. FIG. 4 depicts a schematic diagram of the power supply circuit 100 in FIG. 1 in the overcurrent mode according to some embodiments of the present disclosure.

As illustrated in FIG. 2, at a time point TP1, a state of the load L changes (e.g., from light load to heavy load), so the output current ICC1 suddenly increases rapidly. When the output current ICC1 increases, it means that the current flowing through the transistor M7 and the transistor M8 also increases, so that the sensing voltage VCS1 increases. When the sensing voltage VCS1 is higher than or equal to the reference voltage VREF1, it means entering the over-current mode (time interval D2).

Reference is made to FIG. 4. Since the sensing voltage VCS1 is higher than or equal to the reference voltage VREF1, the comparison voltage VOCP has the high logic value and the inverted comparison voltage VOCP' has the low logic value. The comparison voltage VOCP having the high logic value turns on the transistor M3 and the inverted comparison voltage VOCP' having the low logic value turns off the transistor M4. Since the transistor M4 is turned off, the first voltage VCHP charges the node N4 through the resistor R2, so that the voltage VY located at the node N4 increases (e.g., 10 volts) to further turn off the transistor M2. Additionally, a voltage VPL located at the node N3 is pulled down by the ground voltage of the ground terminal GND through the turned-on transistor M3 (corresponding to a path P2). Since the voltage VPL decreases (e.g., 5 volts), the conduction degree of the transistor M1 becomes smaller. Since the conduction degree of the transistor M1 becomes smaller, the second voltage VG decreases (corresponding to a path P3). Since the second voltage VG decreases (e.g., 4 volts), the conduction degrees of the power switches M5-M6 become smaller. Since the conduction degrees of the power switches M5-M6 become smaller, the output current ICC1 is limited to achieve the effect of overcurrent protection.

Figure 5:
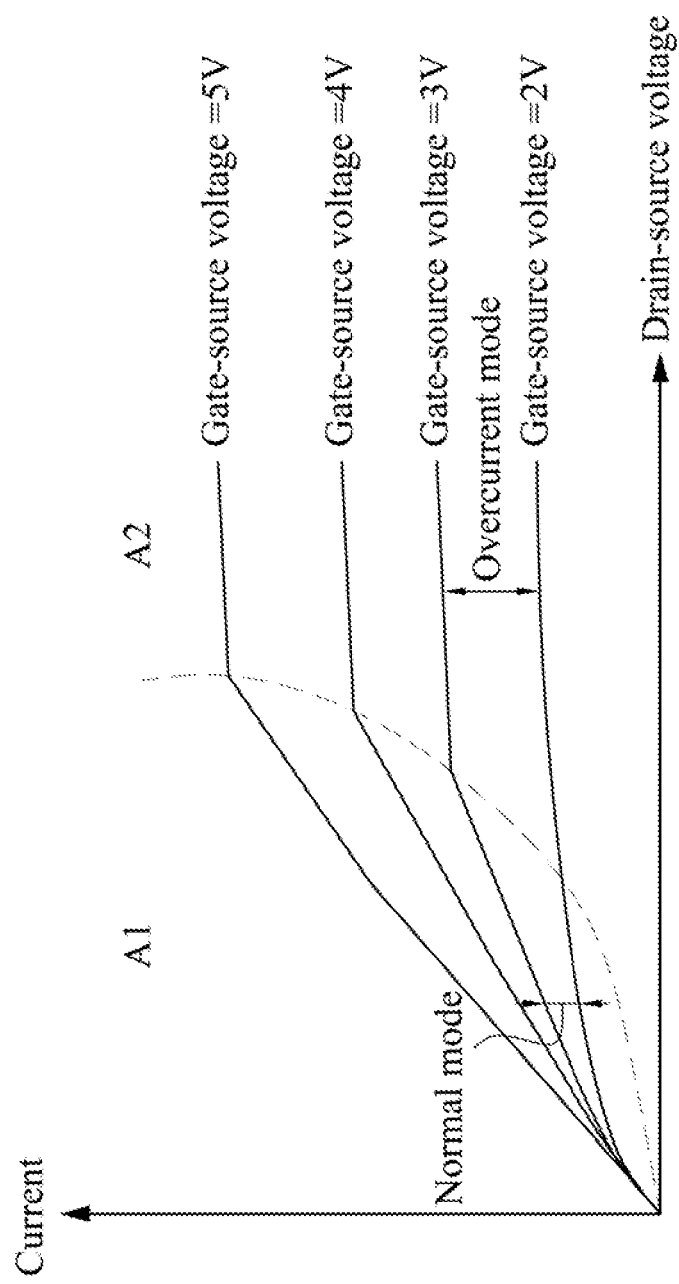
FIG. 5 depicts a schematic diagram of characteristics of a power switch according to some embodiments of the present disclosure.

Reference is made to FIG. 5. FIG. 5 depicts a schematic diagram of characteristics of a power switch according to some embodiments of the present disclosure. As mentioned above, since the clock signal CLK is the high-frequency signal, there are ripples in the first voltage VCHP.

Under the normal mode (FIG. 3), the power switches M5-M6 are operated in a linear region A1. Although there are ripples in the first voltage VCHP (gate), a change in a gate-source voltage does not cause a significant change of a current change. Accordingly, under the normal mode, the ripples of the first voltage VCHP does not significantly affect the output current ICC1 or the output voltage VCC1.

However, under the overcurrent mode (FIG. 4), the power switches M5-M6 are operated in a saturation region A2. The change in the gate-source voltage causes a significant change of the current change. As compared with some relevant technologies, in the present disclosure, the resistor R2 (its resistance value is, for example, 1 million ohms) can achieve the effect of low-pass filtering, so ripples of the voltage VPL are much smaller than those of the first voltage VCHP. In addition to that, since the second voltage VG is a difference between the voltage VPL and a threshold voltage of the transistor M1 (in which the threshold voltage of the transistor M1 is fixed), the ripples of the second voltage VG are also very small or almost non-existent when the ripples of the voltage VPL are very small or almost non-existent. Accordingly, the ripples of the output voltage VCC1 or the output current ICC1 provided to the load L are also very small or almost non-existent.

In addition, as compared with some relevant technologies, in the present disclosure, the first voltage VCHP does not decrease and maintains a same voltage value (e.g., 10 volts) as the normal mode (the time interval D1) after entering the overcurrent mode (the time interval D2). Accordingly, when the power supply circuit 100 recovers from the overcurrent mode (the time interval D2) to the normal mode (a time interval D3), an overall recovery time is shorter.

Figure 6:
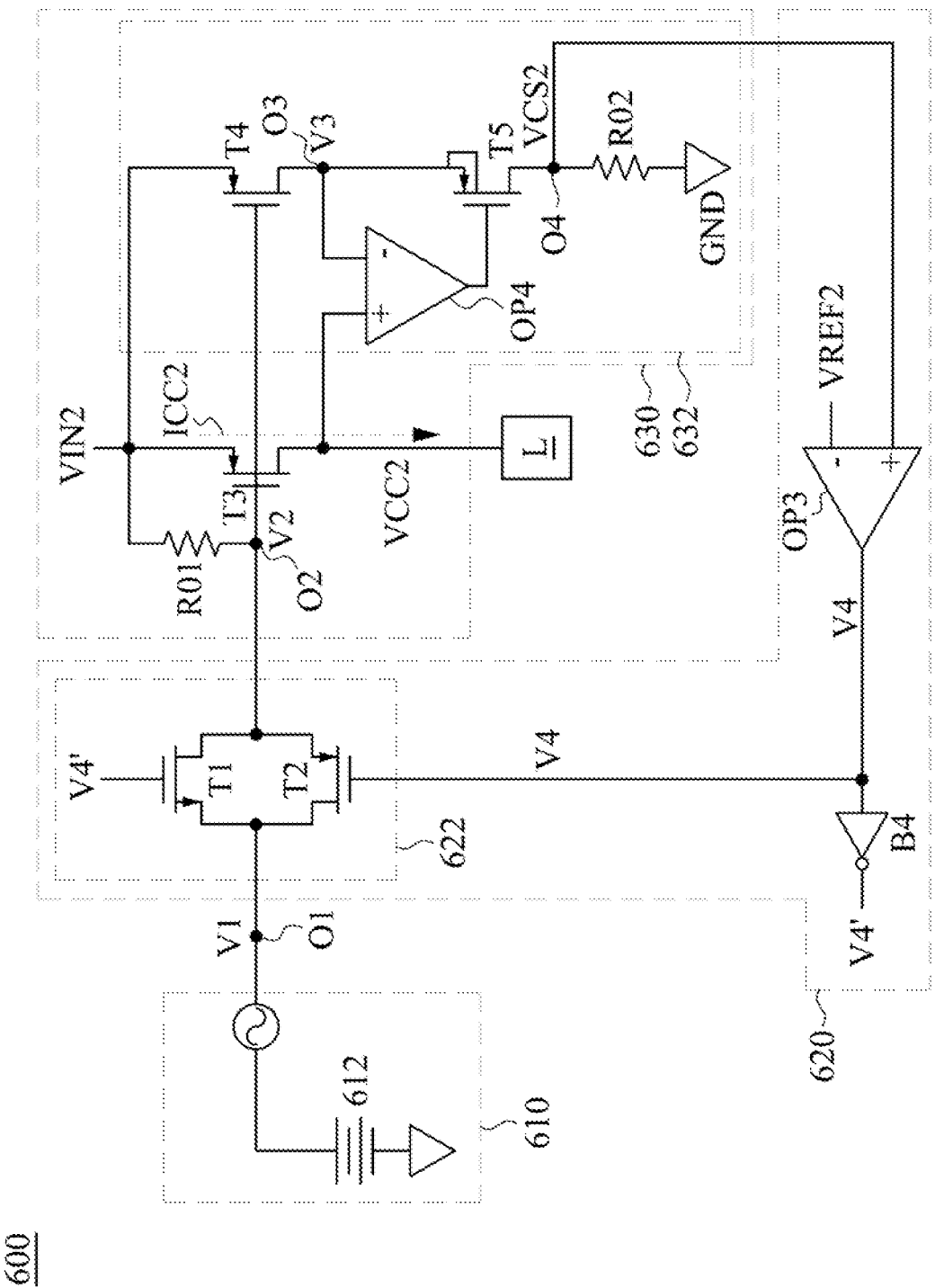
FIG. 6 depicts a schematic diagram of a power supply circuit according to some embodiments of the present disclosure.

Reference is made to FIG. 6. FIG. 6 depicts a schematic diagram of a power supply circuit 600 according to some embodiments of the present disclosure.

As illustrated in FIG. 6, the power supply circuit 600 includes a voltage generator circuit 610, an overcurrent protection circuit 620, and a power switch circuit 630. The voltage generator circuit 610 is coupled to the overcurrent protection circuit 620. The overcurrent protection circuit 620 is coupled to the power switch circuit 630.

The voltage generator circuit 610 is used to generate a first voltage V1 at a node O1. The voltage generator circuit 610 can include a direct current (DC) voltage source 612. The DC voltage source 612 can be a voltage conversion circuit. In practical applications, there may be ripples in the first voltage V1 (e.g., the alternating current (AC) power supply shown in FIG. 6).

The overcurrent protection circuit 620 is used to generate a comparison voltage V4 according to a reference voltage VREF2 and a sensing voltage VCS2 from the power switch circuit 630.

As illustrated in FIG. 6, the overcurrent protection circuit 620 includes a comparator OP3, an inverter B4, and a voltage clamping circuit 622. A negative input terminal of comparator OP3 receives the reference voltage VREF2. A positive input terminal of the comparator OP3 receives the sensing voltage VCS2 from the power switch circuit 630. The comparator OP3 compares the reference voltage VREF2 and the sensing voltage VCS2, so as to generate the comparison voltage V4 at its output terminal. The inverter B4 receives the comparison voltage V4 and inverts it to generate an inverted comparison voltage V4'.

The voltage clamping circuit 622 generates a second voltage V2 at a node O2 according to the comparison voltage V4 from the comparator OP3 and the first voltage V1 from the voltage generator circuit 610. As illustrated in FIG. 6, the voltage clamping circuit 622 includes transistors T1-T2. In this example, the transistor T1 is an N-type transistor, and the transistor T2 is a P-type transistor. The transistor T1 is coupled between the node O1 and the node O2, and the transistor T2 is also coupled between the node O1 and the node O2. The output terminal of the comparator OP3 is coupled to a control terminal of the transistor T2 and the comparison voltage V4 can turn on or turn off the transistor T2. An output terminal of the inverter B4 is coupled to a control terminal of the transistor T1 and the inverted comparison voltage V4' can be transmitted to the control terminal of the transistor T1 to turn on or turn off the transistor T1. Through the operation of the voltage clamping circuit 622, the second voltage V2 is generated at the node O2.

The power switch circuit 630 is used to generate an output current ICC2 according to the second voltage V2 and an input voltage VIN2, and provide the output current ICC2 to the load L.

As illustrated in FIG. 6, the power switch circuit 630 includes a power switch T3, a resistor R01, and a sensing circuit 632. The sensing circuit 632 includes transistors T4-T5, an operational amplifier OP4, and a resistor R02. In this example, the power switch T3 and the transistors T4-T5 are P-type transistors.

The power switch T3 is coupled between the input voltage VIN2 and the load L. In greater detail, a first terminal of the power switch T3 receives the input voltage VIN2. A second terminal of the power switch T3 is coupled to the load L and is used to provide the output current ICC2. A control terminal (the node O2) of the power switch T3 is coupled to the input voltage VIN2 through the resistor R01. The second voltage V2 located at the node O2 can turn on or turn off the power transistor T3.

A first terminal of the transistor T4 is coupled to the first terminal of the power transistor T3. A second terminal of the transistor T4 and a first terminal of the transistor T5 are coupled at a node O3. A control terminal of the transistor T4 is coupled to the node O2. The second voltage V2 located at the node O2 can turn on or turn off the transistor T4. A second terminal of the transistor T5 is coupled to a node O4. A control terminal of the transistor T5 is coupled to an output terminal of the operational amplifier OP4. A positive input terminal of the operational amplifier OP4 receives an output voltage VCC2. A negative input terminal of the operational amplifier OP4 is coupled to the node O3 to receive a voltage V3. The operational amplifier OP4 amplifies the output voltage VCC2 and the voltage V3 to output an amplified voltage so as to turn on or turn off the transistor T5. The resistor R02 is coupled between the node O4 and the ground GND.

The sensing circuit 632 is used to sense the output current ICC2 so as to generate the sensing voltage VCS2 at the node O4 associated with the output current ICC2. In greater detail, if the output voltage VCC2 is equal to the voltage V3, a current flowing through the power switch T3 and a current flowing through the transistor T4 are proportional to areas of the two. For example, under the circumstance that a ratio of the area of the power switch T3 to the area of the transistor T4 is 1000:1, the current flowing through the transistor T4 and the transistor T5 is 1 mA when the output current ICC2 flowing through the power switch T3 is 1 A. The current flowing through the transistor T5 and the resistor R02 can determine a voltage value of the sensing voltage VCS2. In this example, when the output current ICC2 flowing through the power switch T3 is larger, the current flowing through the transistor T4 and the transistor T5 is larger, so that the sensing voltage VCS2 is also higher. How to control the output voltage VCC2 to be equal to the voltage V3 is similar to the foregoing embodiment, so a description in this regard is not repeated here.

Under the normal mode, the output current ICC2 flowing through the power switch T3 is not too large, which means that the current flowing through the transistor T4 is also not too large. Accordingly, the sensing voltage VCS2 is lower than the reference voltage VREF2. Since the sensing voltage VCS2 is lower than the reference voltage VREF2, the comparison voltage V4 has a low logic value and the inverted comparison voltage V4' has a high logic value. The comparison voltage V4 having the low logic value turns on the transistor T2 and the inverted comparison voltage V4' having the high logic value turns on the transistor T1. Under the circumstance that the first voltage V1 is too low (normal mode), the voltage transmission through the transistor T2 is not better and the voltage transmission through the turned-on transistor T1 is better. Since the transistor T1 is turned on by the inverted comparison voltage V4', the first voltage V1 can charge the node O2 through the turned-on transistor T1 to increase the second voltage V2 so as to completely turn on the power switch T3. Similar to the embodiments above, since the power transistor T3 operates in the linear region under the normal mode, the ripples of the first voltage V1 do not significantly affect the output current ICC2 or the output voltage VCC2.

Under the overcurrent mode, the output current ICC2 suddenly increases rapidly. When the output current ICC2 increases, it means that the current flowing through the transistor T4 and the transistor T5 also increases, so that the sensing voltage VCS2 increases. When the sensing voltage VCS2 is higher than or equal to the reference voltage VREF2, the comparison voltage V4 has the high logic value and the inverted comparison voltage V4' has the low logic value. The comparison voltage V4 having the high logic value turns off the transistor T2 and the inverted comparison voltage V4' having the low logic value turns off the transistor T1. Due to the increase of an on-resistance (RON) of the transistors T1-T2, the second voltage V2 located at the node O2 is pulled up by the input voltage VIN2 through the resistor R01. When the second voltage V2 increases, a resistance value of the power switch T3 increases and the conduction degree of the power switch T3 becomes smaller. Since the conduction degree of the power switch T3 becomes smaller, the output current ICC2 is limited to achieve the effect of overcurrent protection. The turned-off transistors T1-T2 can prevent the ripples of the first voltage V1 from being transmitted to the node O2. Since the ripples of the second voltage V2 located at the node O2 are also very small or almost non-existent, the ripples of the output voltage VCC2 or the output current ICC2 provided to the load L are also very small or almost non-existent.

Figure 7:
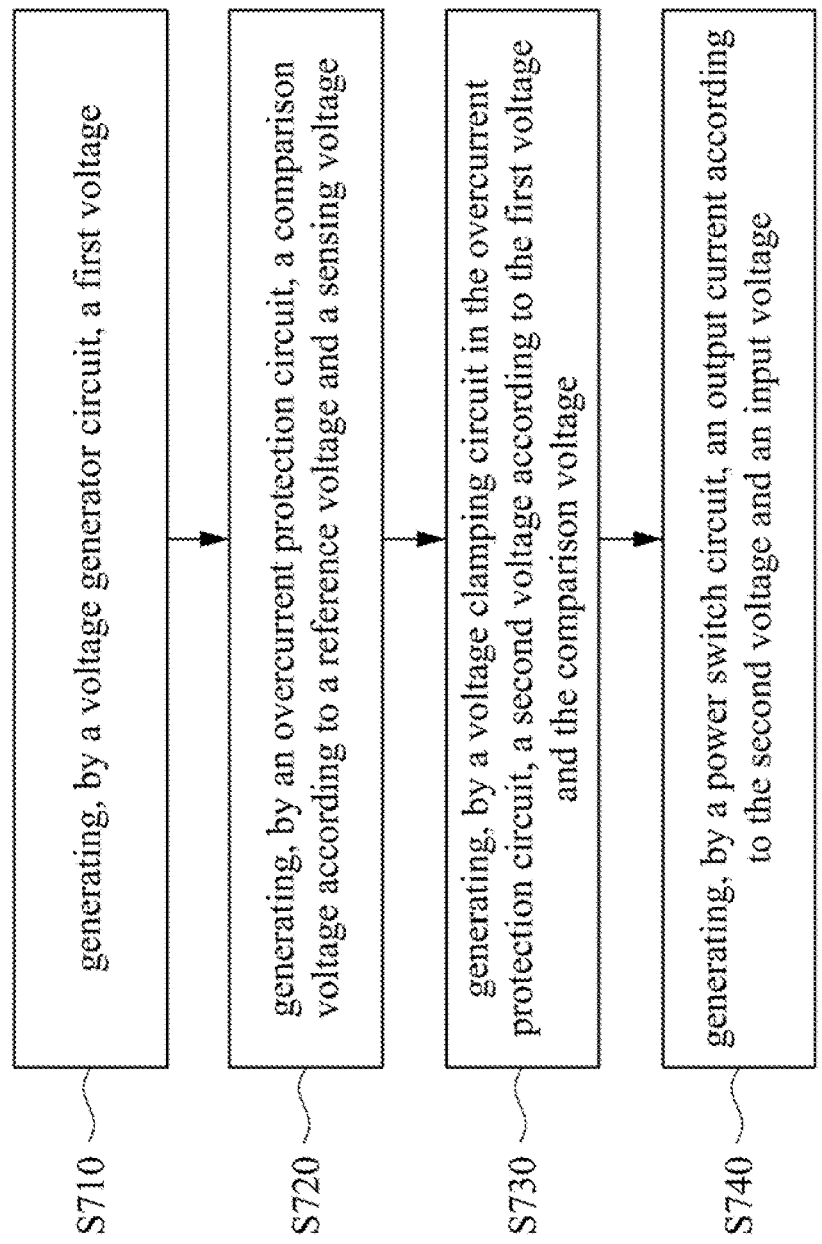
FIG. 7 depicts a flowchart of a control method of a power supply circuit according to some embodiments of the present disclosure.

Reference is made to FIG. 7. FIG. 7 depicts a flowchart of a control method 700 of a power supply circuit according to some embodiments of the present disclosure. In some embodiments, the control method 700 can be applied to the power supply circuit 100 of FIG. 1 or the power supply circuit 600 of FIG. 6, but the present disclosure is not limited thereto.

As illustrated in FIG. 7. The control method 700 includes an operation S710, an operation S720, an operation S730, and an operation S740. For better understanding, the above operations are described with reference to the power supply circuit 100 of FIG. 1 as follows.

In operation S710, the first voltage VCHP is generated by the voltage generator circuit 110. In the embodiment shown in FIG. 1, the power switches M5-M6 are N-type transistors, and the voltage generator circuit 110 is a charge pump.

In operation S720, the comparison voltage VOCP is generated by the overcurrent protection circuit 120 according to the reference voltage VREF1 and the sensing voltage VCS1. In the embodiment shown in FIG. 1, when the sensing voltage VCS1 is lower than the reference voltage VREF1, the comparison voltage VOCP has a low logic value (e.g., logic value 0). When the sensing voltage VCS1 is higher than or equal to the reference voltage VREF1, the comparison voltage VOCP has a high logic value (e.g., logic value 1).

In operation S730, the second voltage VG is generated by the voltage clamping circuit 122 in the overcurrent protection circuit 120 according to the first voltage VCHP and the comparison voltage VOCP. In the embodiment shown in FIG. 1, by disposing the voltage clamping circuit 122, the ripples of the second voltage Vg can be very small or almost non-existent.

In operation S740, the output current ICC1 is generated by the power switch circuit 130 according to the second voltage VG and the input voltage VIN1. In the embodiment shown in FIG. 1, since the ripples of the second voltage VG (the voltage of control terminals of the power switches M5-M6) are very small or almost non-existent, the ripples of the output voltage VCC1 and the output current ICC1 generated by the power transistors M5-M6 are also very small or almost non-existent.

As described above, in the present disclosure the voltage clamping circuit can prevent the excessive ripples of the output voltage and output current under the overcurrent mode.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply circuit, comprising:
    a voltage generator circuit configured to generate a first voltage;
    an overcurrent protection circuit configured to generate a comparison voltage according to a reference voltage and a sensing voltage, wherein the overcurrent protection circuit comprises:
        a voltage clamping circuit configured to generate a second voltage according to the first voltage and the comparison voltage; and
    a power switch circuit configured to generate an output current according to the second voltage and an input voltage, wherein the sensing voltage is generated at a node in the power switch circuit and is associated with the output current.

2. The power supply circuit of claim 1, wherein the voltage clamping circuit comprises:
    a first transistor coupled between a first node and a second node; and
    a second transistor coupled between the first node and the second node;
    wherein the first voltage is generated at the first node, and the second voltage is generated at the second node.

3. The power supply circuit of claim 2, wherein the first transistor is an N-type transistor, and the second transistor is a P-type transistor.

4. The power supply circuit of claim 2, wherein the voltage clamping circuit further comprises:
    a first resistor coupled between the first node and a control terminal of the first transistor;
    a second resistor coupled between the first node and a control terminal of the second transistor;
    a third transistor coupled between the control terminal of the first transistor and a ground terminal; and
    a fourth transistor coupled between the control terminal of the second transistor and the ground terminal.

5. The power supply circuit of claim 4, wherein each of the first transistor, the third transistor, and the fourth transistor is an N-type transistor, and the second transistor is a P-type transistor.

6. The power supply circuit of claim 4, wherein the comparison voltage is configured to turn on or turn off the third transistor, and an inverted comparison voltage is configured to turn on or turn off the fourth transistor.

7. The power supply circuit of claim 6, wherein the overcurrent protection circuit further comprises:
    a comparator, wherein a negative input terminal of the comparator is configured to receive the reference voltage, a positive input terminal of the comparator is configured to receive the sensing voltage, and an output terminal of the comparator is configured to generate the comparison voltage; and
    an inverter configured to invert the comparison voltage so as to generate the inverted comparison voltage.

8. The power supply circuit of claim 6, wherein the power switch circuit comprises:
    a first power switch;
    a second power switch, wherein the first power switch and the second power switch are connected back-to-back between the input voltage and a load; and
    a sensing circuit configured to sense the output current so as to generate the sensing voltage.

9. The power supply circuit of claim 8, wherein each of the first power switch and the second power switch is an N-type transistor.

10. The power supply circuit of claim 9, wherein a source terminal of the first power switch is directly coupled to a source terminal of the second power switch.

11. The power supply circuit of claim 2, wherein the comparison voltage is configured to turn on or turn off the second transistor, and an inverted comparison voltage is configured to turn on of turn off the first transistor.

12. The power supply circuit of claim 11, wherein the overcurrent protection circuit further comprises:
    a comparator, wherein a negative input terminal of the comparator is configured to receive the reference voltage, a positive input terminal of the comparator is configured to receive the sensing voltage, and an output terminal of the comparator is configured to generate the comparison voltage; and
    an inverter configured to invert the comparison voltage so as to generate the inverted comparison voltage.

13. The power supply circuit of claim 11, wherein the power switch circuit comprises:
- a power switch coupled between the input voltage and a load;
- a resistor, wherein a control terminal of the power switch is coupled to the input voltage through the resistor; and
- a sensing circuit configured to sense the output current so as to generate the sensing voltage.

14. The power supply circuit of claim 13, wherein the power switch is a P-type transistor.

15. The power supply circuit of claim 1, wherein when the output current is larger, the sensing voltage is higher.

16. A control method of a power supply circuit, comprising:
- generating, by a voltage generator circuit, a first voltage;
- generating, by an overcurrent protection circuit, a comparison voltage according to a reference voltage and a sensing voltage;
- generating, by a voltage clamping circuit in the overcurrent protection circuit, a second voltage according to the first voltage and the comparison voltage; and
- generating, by a power switch circuit, an output current according to the second voltage and an input voltage, wherein the sensing voltage is generated at a node in the power switch circuit and is associated with the output current.

17. The control method of claim 16, wherein the voltage clamping circuit comprises a first transistor and a second transistor coupled between a first node and a second node, wherein the first voltage is generated at the first node, and the second voltage is generated at the second node, wherein the control method further comprises:
- when the sensing voltage is higher than or equal to the reference voltage, outputting, by a comparator in the overcurrent protection circuit, a comparison voltage to turn on a third transistor, wherein the third transistor is coupled between a control terminal of the first transistor and a ground terminal; and
- generating, by an inverter in the overcurrent protection circuit, an inverted comparison voltage to turn off a fourth transistor, wherein the fourth transistor is coupled between a control terminal of the second transistor and the ground terminal;
- wherein a first resistor is coupled between the first node and the control terminal of the first transistor, and a second resistor is coupled between the first node and the control terminal of the second transistor.

18. The control method of claim 17, wherein the power switch circuit comprises a first N-type power switch and a second N-type power switch, and the first N-type power switch and the second N-type power switch are connected back-to-back between the input voltage and a load, wherein the control method further comprises:
- turning on or turning off the first N-type power switch and the second N-type power switch by the second voltage to control the output current.

19. The control method of claim 16, wherein the voltage clamping circuit comprises a first transistor and a second transistor coupled between a first node and a second node, wherein the first voltage is generated at the first node, and the second voltage is generated at the second node, wherein the control method further comprises:
- when the sensing voltage is higher than or equal to the reference voltage, outputting, by a comparator in the overcurrent protection circuit, a comparison voltage to turn off the second transistor; and
- generating, by an inverter in the overcurrent protection circuit, an inverted comparison voltage to turn off the first transistor.

20. The control method of claim 19, wherein the power switch circuit comprises a P-type power switch, and the P-type power switch is connected between the input voltage and a load, wherein the control method further comprises:
- turning on or turning off the P-type power switch by the second voltage to control the output current.

* * * * *